(12) United States Patent
Salpietra

(10) Patent No.: US 7,706,509 B2
(45) Date of Patent: Apr. 27, 2010

(54) KEYBOARD FOR BLIND PEOPLE

(76) Inventor: Gianni Salpietra, Via Corte Dell'Arsenale, 5, Robecco Sul Naviglio (IT) 20087

( * ) Notice: Subject to any disclaimer, the term of this patent is extended or adjusted under 35 U.S.C. 154(b) by 860 days.

(21) Appl. No.: 11/540,595

(22) Filed: Oct. 2, 2006

(65) Prior Publication Data

US 2007/0120827 A1    May 31, 2007

Related U.S. Application Data

(63) Continuation-in-part of application No. 10/471,400, filed as application No. PCT/EP02/03969 on Apr. 10, 2002, now abandoned.

(30) Foreign Application Priority Data

May 31, 2001    (IT) .......................... MI2001A1163

(51) Int. Cl.
*H04M 11/00*    (2006.01)
(52) U.S. Cl. ...................................................... 379/52
(58) Field of Classification Search .................. 379/52;
345/168, 169, 171, 172
See application file for complete search history.

(56) References Cited

U.S. PATENT DOCUMENTS 6,542,623 B1 *   4/2003   Kahn .......................... 382/114

7,029,190 B1 *   4/2006   Davis et al. .................. 400/483

FOREIGN PATENT DOCUMENTS

DE           299 19 123         3/2001

OTHER PUBLICATIONS

"TALX for the Nokia Communicator 9110/9110i" Torsten Brand-Software Service, [Online] XP002214668 Retrieved from the Internet: <URL:http://web.archive.org/web/20010430045903/http://www/talx.de/index_e.htm> [retrieved on Sep. 24, 2002] the whole document.
J.Gjoderum, H. Hypponen, K. Nordby, S.-E. Ruud, J. Ekberg, M. Martin: "Guidelines-Booklet on Mobile-Phones" Cost 219, [Online] Apr. 11, 2001, XP002214669 Retrieved from the Internet: <URL:http://www.stakes.fi/cost219/mobileph one.htm> [retrieved on Sep. 24, 2002] section 6.9 Additional accessibility issues section 6.6 Battery and recharging.
Patent Abstracts of Japan vol. 2000, No. 01, Jan. 31, 2000 & JP 11 289409 A (Ricoh Co Ltd), Oct. 19, 1999 abstract.

* cited by examiner

*Primary Examiner*—Stella L Woo
(74) *Attorney, Agent, or Firm*—Young & Thompson

(57) ABSTRACT

The keyboard for blind people comprises a body carrying a plurality of keys and interface means for its connection to an external unit. The keys have a number of portions each having associated a function of the key and having represented such a function in Braille characters thereon. Moreover, the keys are jerky rotatable connected to the body so as to select one of the portions of the key and are also pressable in order to activate that function associated to the activable portion, so that each function is selected through rotations and subsequent pressure of the corresponding key portion.

15 Claims, 3 Drawing Sheets

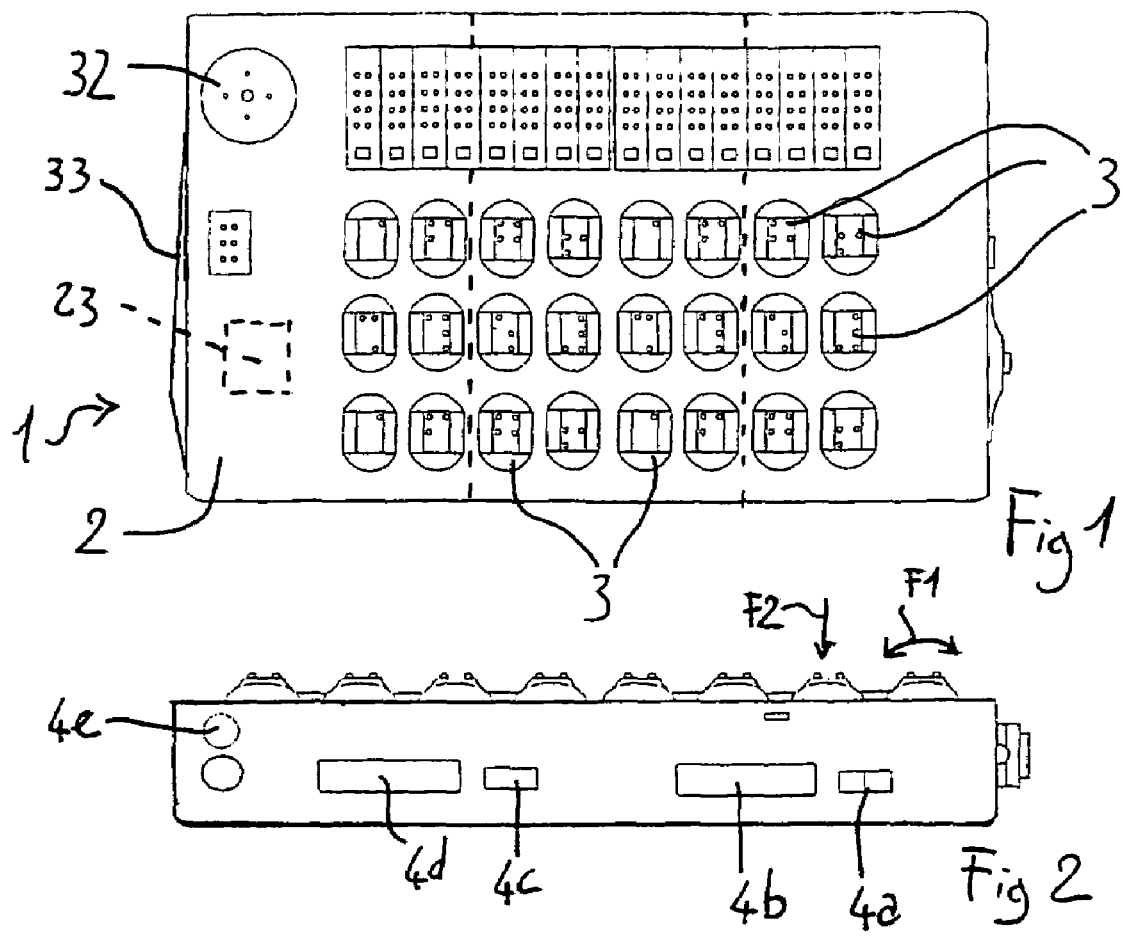
Fig 1
Fig 2
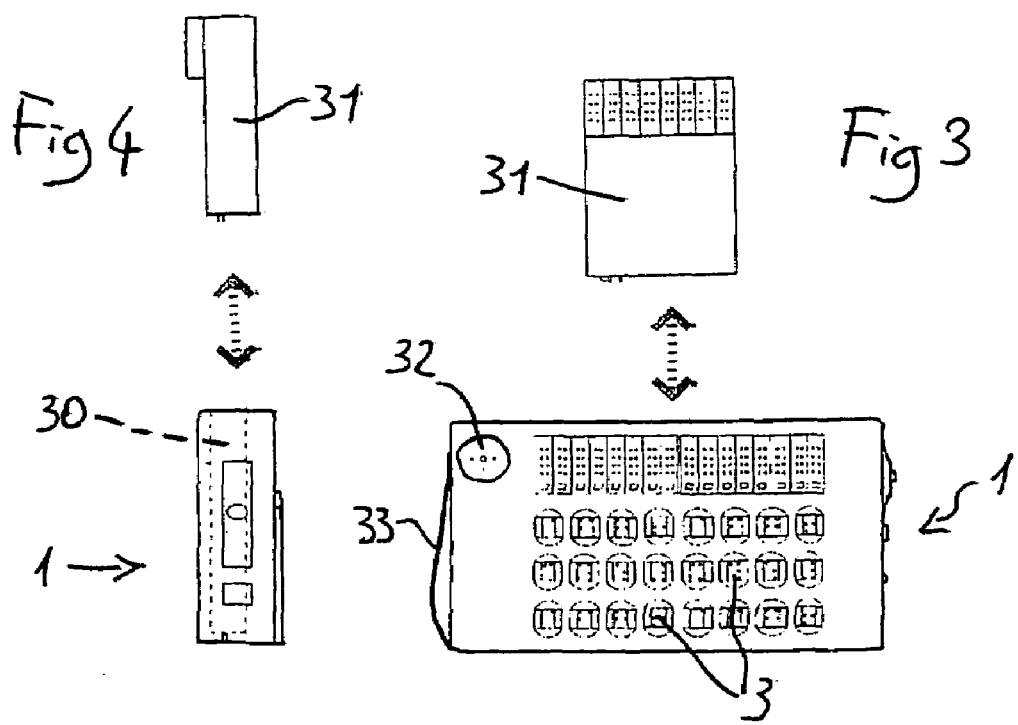
Fig 4
Fig 3

KEYBOARD FOR BLIND PEOPLE

This application is a continuation-in-part of my co-pending application Ser. No. 10/471,400, filed on Sep. 10, 2003.

FIELD OF THE INVENTION

The present invention relates to a keyboard for blind people.

Particularly, the present invention relates to a keyboard connectable to a generic external unit in order to function as an input device for blind people. Moreover, the keyboard according to the present invention has also the possibility to function as an output device through Braille bars or enlarged displays.

BACKGROUND OF THE INVENTION

As known in the art, electronic devices usually comprise a keyboard as an input device and displays as output devices (such devices are for example PC, telephones, mobiles, laptops, and so on).

Such input and output devices have dimensions and structures particularly arranged to be used by people having no visual problem.

DISCUSSION OF THE RELATED ART

Nevertheless such input and output devices of a generic electronic device are not arranged to be used by visually impaired or blind people because blind people do not have any reference on the keys in order to know which key they are going to press and which function is associated to the key.

In addition, even keyboards particularly arranged to be used by blinds have the drawback of having very large dimensions, in order for the key to be in sufficient number to define all the Braille characters and to have dimensions sufficient to allow the blinds to activate them without problems.

SUMMARY OF THE INVENTION

The technical aim of the present invention is therefore to provide a keyboard for blind people by which the said problems of the known art are eliminated.

Within the scope of this technical aim, an object of the invention is to provide a keyboard which can be used by blinds in association with a generic electronic device.

Another object of the invention is to provide a keyboard having very low dimensions and, in particular, dimensions much lower than the ones of the existing keyboards for blinds.

The technical aim, together with these and further objects, are attained according to the invention by providing a keyboard for blind people in accordance with the accompanying claims.

BRIEF DESCRIPTION OF THE DRAWING

Further characteristics and advantages of the invention will be more apparent from the description of a preferred but non-exclusive embodiment of the keyboard for blind people according to the invention, illustrated by way of non-limiting example in the accompanying drawings, in which:

FIGS. 1 and 2 are respectively a frontal and a side view of the keyboard according to the invention;

FIGS. 3 and 4 are respectively a frontal and a side view of the keyboard of the invention with a Braille bar associated thereto;

DETAILED DESCRIPTION OF THE INVENTION

Figure 5:
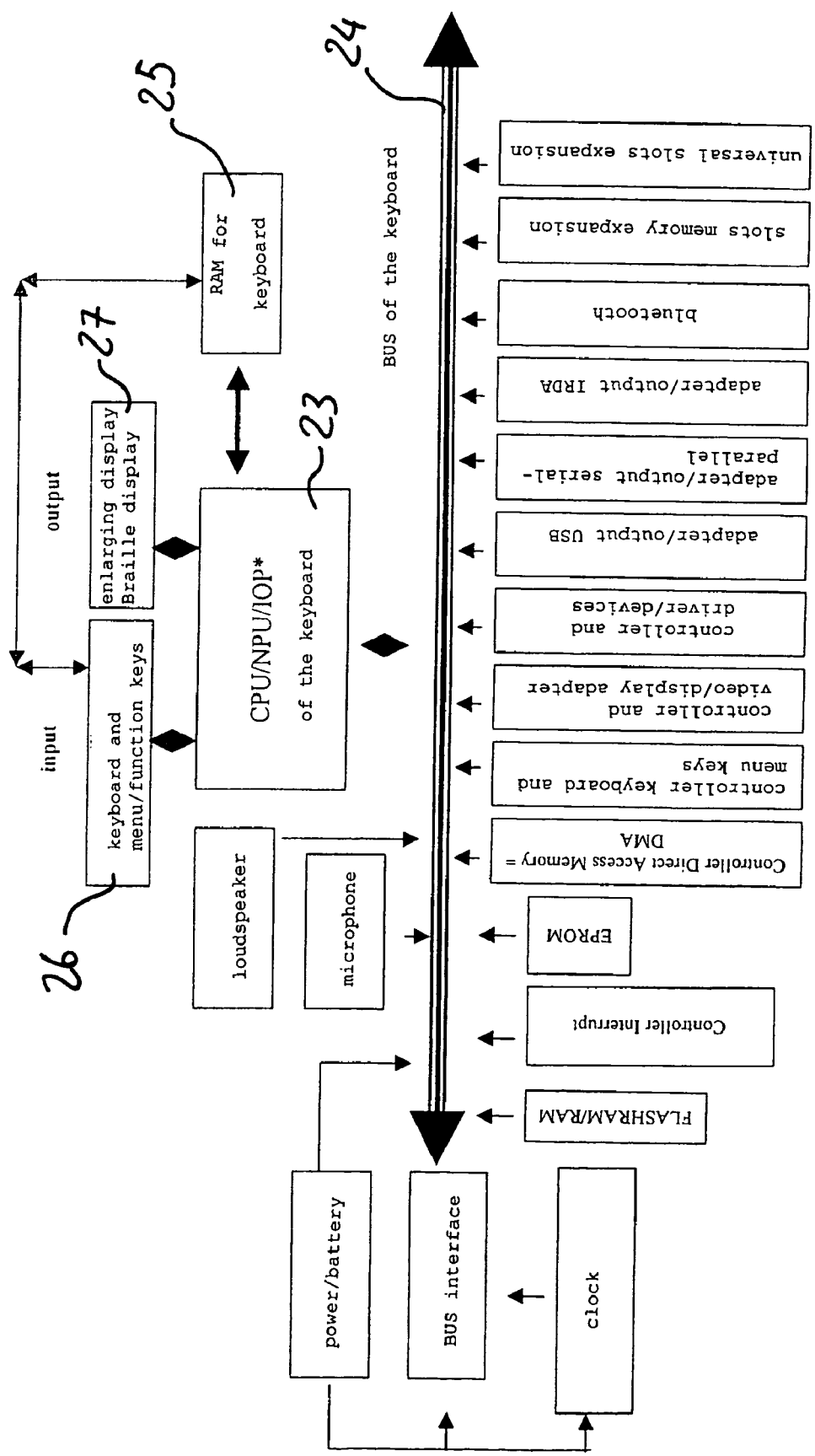
FIG. 5 is a functional schematic view of the keyboard of the invention.
Figures 6A, 6B, 6C, 6D:
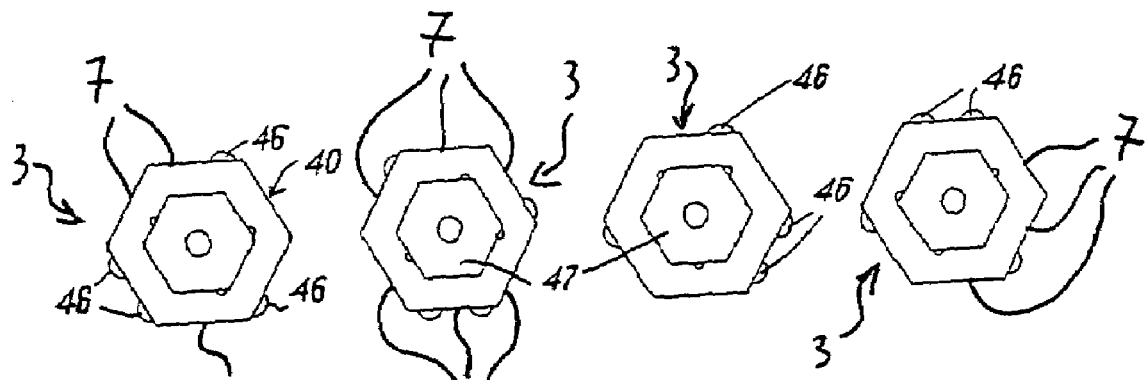
FIGS. 6A, 6B, 6C, 6D; 7A, 7B, 7C, 7D; 8A, 8B, 8C, are side and front views of a key for a telephone according to the invention in different positions of use.

With reference to the figures, these show a keyboard 1 for blind people comprising a body 2 carrying a plurality of keys 3 and interface means 4a, b, c, d, e for its connection to an external unit like a PC or the like.

The keys 3 have a number of portions 7 each having associated a function of the key and having represented such a function in Braille characters thereon; such a function is for exemple a letter to be shown on a display.

Moreover, the keys 3 are jerky rotatable connected to the body 2 (see arrow F1) so as to select one of the portions 7 of the key 3; such a selected portion is the one completely directed towards the outer of the body 2.

The keys 3 are also pressable (see arrow F2) in order to activate that function associated to the selected portion, so that each function is selected through rotations (F1) and subsequent pressure (F2) of the corresponding key portion.

The keys 3 present polygonal form and, preferably, it has a parallelepipedal form having hexagonal bases and all side portions 7 have dimensions at least equal to 4×7 mm and preferably 5×8 mm in order to present the tactile smallest area for blind people.

Figures 7A, 7B, 7C, 7D:
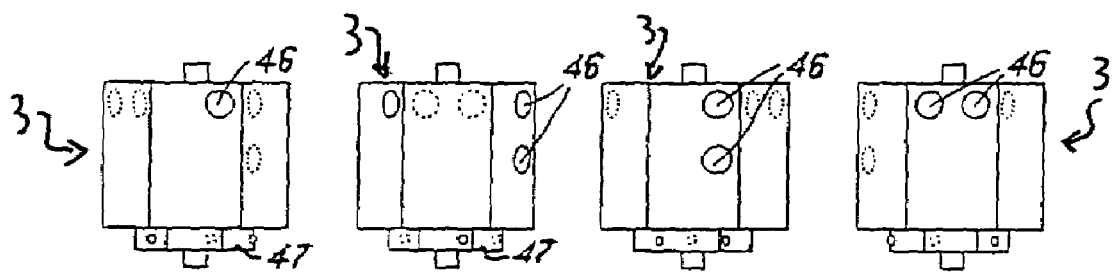

Particularly, the keys have three out of the six portions, in alternate, having no function associated thereto. Moreover each of the portions 7 of the keys 3 has, embossed on its surface, Braille characters 46 indicative of the function or letter associated to it (for example FIGS. 7A, 7C, 7D, 8A, 8C show the position corresponding to the letters A, B, C, respectively); in addition the Braille characters can also indicate special and punctuation marks. The remaining three faces do not present any character (as represented in FIG. 7B) and do not have any function associated thereto.

Particularly forty-two (42) letters have been chosen, with variants, and six (6) signs for the punctuation marks. By using the rotation keys, it is possible to considerably reduce the total number of the keys (with obvious advantages in terms of speed/easiness on composition and containment and limiting the dimensions of the telephone).

The keys 3 have at one end a projection 47 having a reduced section compared to the key and the same shape of the key 3.

The projection 47 is provided with relieves 49 on it carrying electrical contacts for the activation of the keys 3.

The keyboard also comprises an internal CPU 23 programmable in order to define the function of each portion 7 of each key.

FIG. 5 shows the CPU 23 connected to the BUS 24 to a RAM memory 25 and to the controller of the keys 26 and Braille or enlarging display 27.

Through the BUS 24 the CPU 23 can control (in a way known in the art) all the devices of the keyboard 1.

The keyboard further comprises communication means arranged to receive information from an external unit and to communicate it to a blind people.

Such communication means comprise a seat 30 arranged to receive (alternatively) an extractable Braille bar 31, and an extractable video display (not shown); such a display is preferably arranged to display characters in large dimensions.

In addition, the communication means comprise means such as a loudspeaker 32 arranged to realise a vocal synthesis so as to produce a vocal message corresponding to a message intelligible to blind people.

Preferably the keyboard has a removable lasso 33 for its holding and is foldable (when the display or the Braille bar are extracted by the seat 30) in order to reduce its dimension when not used.

The operation of the keyboard of the invention is apparent from that described and illustrated and is substantially the following.

First of all the keyboard 1 must be connected to a device for which it must constitute an input/output interface.

This may be done through the interface means 4a, b, c, d, e constituted by a IRDA/Bluetooth communicator 4a, a serial/parallel port 4b, a USB port 4C, a memory expansion slot 4d, a microphone 4e associated to the keyboard.

After that the keys of the keyboard can be used in order to communicate messages to the device.

The operation of the rotating keys takes place by rotating (F1) the key presenting the desired character/function/letter until it (the key) shows on the upper side of the keyboard the desired portion 7 of the key with the desired Braille symbol 46. Thus this key is pressed (F2) so that, through the underlying contacts, electric circuits 48, relative to the representation of the corresponding Braille symbols, are activated.

Figures 8A, 8B, 8C:
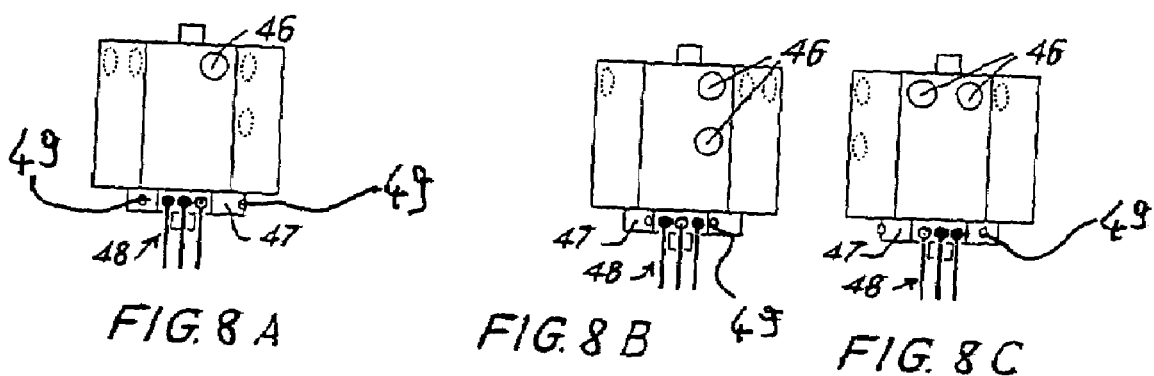

Therefore, each pressure of the key corresponding to a letter or function causes the closing of a particular and univocal combination of contacts 48 (such as represented in FIGS. 8A, 8B, 8C) what will cause the sending of a corresponding univocal signal to the device control unit.

It has been found in practice that the keyboard according to the invention is particularly advantageous because it is connectable to a number of different electrical devices so as the blinds may communicate with such electrical devices.

keyboards conceived in this manner are susceptible to numerous modifications and variants, all falling within the scope of the inventive concept; moreover all details can be replaced by technically equivalent elements.

In practice the materials used and the dimensions can be chosen at will according to requirements and the state of the art.

What I claim is:

1. Keyboard for blind people comprising:
   a body carrying a plurality of keys and interface means for connection of said body to an external unit,
   wherein each of said plurality of keys has a number of portions, each of the portions being associated with a respective function of the respective key where the respective function is represented on the respective portion in Braille characters, each of said plurality of keys being rotatably connected to said body so as to select one of the portions and being also pressable in order to activate the function of the selected one of the portions, so that each function is selected through rotation and subsequent pressure of the corresponding key portion.

2. Keyboard according to claim 1, wherein each of said plurality of keys has a polygonal form.

3. Keyboard according to claim 2, wherein said polygonal form is a parallelepipedal form having hexagonal bases.

4. Keyboard according to claim 3, wherein each of said plurality of keys has all side faces with dimensions at least equal to 4×7 mm.

5. Keyboard according to claim 4, wherein each of said plurality of keys has three out of the six faces, in alternate, having no function associated thereto.

6. Keyboard according to claim 5, wherein each of said plurality of keys has at one end a projection having a reduced section, compared to said polygonal form, said reduced section projection carrying electrical contacts for the activation of the respective one of the plurality of keys.

7. Keyboard according to claim 6, wherein said reduced section projection have the same shape as the respective one of the plurality of keys.

8. Keyboard according to claim 1, further comprising an internal CPU programmable in order to define the function of each portion of each key.

9. Keyboard according to claim 8, further comprising communication means arranged to receive information from an external unit and to communicate with a blind person.

10. Keyboard according to claim 9, wherein said communication means comprise a seat arranged to receive an extractable Braille bar.

11. Keyboard according to claim 9, wherein said communication means comprise a seat arranged to receive an extractable video display.

12. Keyboard according to claim 1, further comprising means arranged to realise a vocal synthesis so as to produce a vocal message corresponding to a message intelligible to blind people.

13. Keyboard according to claim 1, wherein each of said portion of said keys has, embossed on their surface, Braille characters indicative of the function associated to said portion.

14. Keyboard according to claim 1, further comprising a removable lasso for its holding.

15. Keyboard according to claim 1, further being foldable in order to reduce its dimension when not used.

* * * * *